United States Patent [19]

Sundermann et al.

[11] 4,195,132

[45] Mar. 25, 1980

[54] CROSS-LINKED PLASTICS BASED ON CYANIC ACID ESTERS AND METHOD OF PRODUCTION THEREOF

[75] Inventors: Rudolf Sundermann, New Martinsville, Pa.; Günther Rottloff, Cologne; Ernst Grigat, Odenthal, both of Fed. Rep. of Germany

[73] Assignee: Bayer Aktiengesellschaft, Leverkusen, Fed. Rep. of Germany

[21] Appl. No.: 794,196

[22] Filed: May 5, 1977

[30] Foreign Application Priority Data

May 8, 1976 [DE] Fed. Rep. of Germany ....... 2620487

[51] Int. Cl.² ............................................. C08G 73/06

[52] U.S. Cl. .................................. 521/155; 528/225; 528/228; 525/123; 528/266; 528/267; 528/48; 528/289; 528/377; 528/49; 528/381; 528/391; 528/51; 528/422; 528/423; 528/53; 525/457; 525/434; 528/55; 525/471; 525/398; 528/56; 525/509; 525/437; 528/57; 528/58; 528/73; 528/74; 528/78; 528/79; 528/80; 528/81; 528/82; 528/84; 528/85; 528/125; 528/126; 528/172; 528/179; 528/180; 528/181; 528/182; 528/190; 528/191; 528/210; 528/211; 528/223; 528/224; 528/128

[58] Field of Search ................... 260/47 R, 47 CB, 49, 260/47 CP; 528/73, 74, 77, 48, 49, 51, 53, 55, 56, 57, 58, 47, 78, 79, 80, 82, 84, 81, 85, 210, 211, 172, 125, 128, 126, 377, 381, 391, 422, 423, 221, 228, 190, 191, 273, 289, 231, 266, 267, 179, 180, 181, 182, 223, 224, 225; 521/155; 525/123

[56] References Cited

U.S. PATENT DOCUMENTS

| | | | |
|---|---|---|---|
| 3,595,900 | 7/1971 | Loudas et al. | 260/453 |
| 3,694,410 | 9/1972 | Oehmke | 260/47 R |
| 3,738,962 | 6/1973 | Loudas et al. | 260/47 R |
| 3,978,028 | 8/1976 | Sundermann et al. | 260/61 |

*Primary Examiner*—Lester L. Lee
*Attorney, Agent, or Firm*—Gene Harsh; Joseph C. Gil; R. Brent Olson

[57] ABSTRACT

The present invention relates to novel, substantially insoluble and infusible plastics which are cross-linked by way of triazine rings and, optionally, by way of tri-substituted bis-oxymethylene urea groups or urethane groups.

17 Claims, No Drawings

CROSS-LINKED PLASTICS BASED ON CYANIC ACID ESTERS AND METHOD OF PRODUCTION THEREOF

BACKGROUND OF THE INVENTION

It is known from German Auslegeschrift No. 1,190,184 that difunctional or polyfunctional cyanic acid esters may be polymerized to form high molecular weight polytriazines. The polymerization reaction, which is highly exothermic, takes place by way of a so-called "B-stage" and is accompanied by a fairly considerable shrinkage (Kunststoff-Handbuch, Vol. 58, page 829 (1968)). This gives rise to various disadvantages, including inadequate dimensional stability of the thus-produced moldings. According to British Pat. No. 1,305,762, these disadvantages may be obviated by interrupting the polymerization reaction by cooling after a prepolymer has formed, i.e. after from about 30 to 65% of the cyanic acid ester groups have reacted.

German Offenlegungsschrift No. 2,360,709 relates to a process for the production of triazine prepolymers in which aromatic dihydroxyl or polyhydroxyl compounds are initially condensed with less than ⅓ mol of cyanuric chloride per hydroxyl group and the free hydroxyl groups in the thus-obtained condensation product are subsequently reacted with a halogen cyanide in the presence of a base.

DESCRIPTION OF THE INVENTION

It has now been found that high-quality plastics may be obtained by initially reacting organic polyols with difunctional or polyfunctional cyanic acid esters to form a prepolymer which contains free hydroxyl and iminocarboxylic acid ester groups, and subsequently hardening this prepolymer (a) by heating and/or (b) by reaction with polyisocyanates and, optionally, other compounds containing isocyanate-reactive groups. If the hardening reaction is carried out in the absence of a polyisocyanate, polytriazines containing polyols as internal plasticizers are formed in accordance with the present invention. In cases where crosslinking is carried out using polyisocyanates, the plastics obtained contain, on the one hand, triazine rings and, on the other hand, tri-substituted bis-oxymethylene urea groups or urethane groups.

Accordingly, the present invention relates to a process for the production of crosslinked plastics based on cyanic acid esters, distinguished by the fact that, in a first reaction stage, organic polyhydroxyl compounds are reacted at temperatures of from 30° to 250° C. with difunctional or polyfunctional cyanic acid esters to form partially crosslinked prepolymers which are still soluble in organic solvents and, in a second stage, these prepolymers are hardened (a) by heating to from 100° to 350° C. and/or (b) by reaction with polyisocyanates and, optionally, compounds containing isocyanate-reactive groups.

The cyanic acid esters used in accordance with the present invention are preferably aromatic and correspond to the following general formula $$Ar(OCN)_n \qquad (I)$$

wherein

Ar represents an aromatic radical or an aromatic radical interrupted by one or more bridge members, and n is a number of from 2 to 5.

The aromatic cyanic acid esters corresponding to general formula (I) used in accordance with the present invention are known compounds and are described, for example in British Pat. No. 1,007,790, and may be produced by the process described therein. Thus, for example, from 1 to 1.1 mol of cyanogen halide and 1 mol of a base or mixture of bases may be used per phenolic hydroxyl group. The reaction temperatures are in the range of from −40° C. to +65° C. Suitable bases are inorganic bases, such as sodium hydroxide, potassium hydroxide, soda, potash and calcium hydroxide, or tertiary amines, such as trimethylamine or triethylamine, while suitable solvents or suspending agents include water, alcohols, ketones, hydrocarbons, chlorinated hydrocarbons or mixtures thereof.

The aromatic cyanic acid esters preferably used correspond to the following general formula:

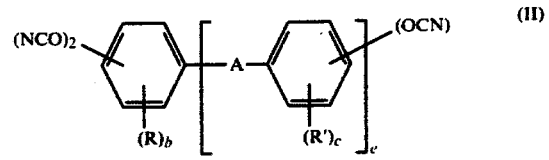

wherein each R: may be the same or different, and represents (i) hydrogen, (ii) halogen, (iii) straight or branched $C_1$-$C_9$ alkyl, (iv) phenyl, (v) two adjacent radicals R on the same nucleus may together form a carbocyclic 5- or 6-membered ring, (vi) two adjacent radicals R may, together with a hetero atom (O, S, N), form a 5- or 6-membered heterocyclic ring, (vii) alkoxy radicals having from 1 to 4 carbon atoms, or (viii) alkoxy carbonyl radicals having from 1 to 4 carbon atoms in the alkyl group;

R': has the same meaning as R or represents the group:

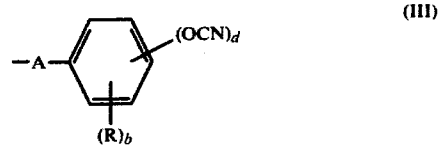

A: represents (i) a direct bond, (ii) a $C_1$-$C_9$ alkylene group optionally substituted by $C_1$-$C_4$ alkyl or phenyl, (iii) a cycloaliphatic or aromatic 5- or 6-membered ring optionally interrupted by oxygen, (iv) oxygen, (v) a sulphonyl group (—SO$_2$—), (vi) a carbonyl dioxide group

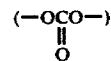

or (vii) a carbonyl group and a: represents a number of from 1 to 5 when $e \geq 1$, and a number of from 2 to 5 when $e = 0$;

b: represents 5−a when $e \geq 1$ and 6−(a+d) when $e = 0$;

c: represents 5−d;

d: represents a number of from 0 to 5 and e: represents 0, 1, 2 or 3 with the proviso that the sum of a and d is always a number from 2 to 5.

More preferably, the symbols in general formula (II) have the following meanings:

R: hydrogen, fluorine, chlorine or bromine, $C_1$-$C_4$ alkyl, methoxy, ethoxy, methoxy carbonyl, ethoxy carbonyl or butoxy carbonyl;

A: a direct bond, oxygen, a sulphonyl group, a carbonyl group, a carbonyl dioxide group, a methylene group, ethylene group, 2,2-propylene group

or a cyclohexylene radical;

a: the number 1 when $e \geq 1$, and the number 2 when $e=0$;

b: the number 1 or 2, and most preferably the number 1;

c: the number 1 or 2, and most preferably the number 1;

d: the number 0 or 1 and e: the number 0, 1, 2 or 3, with the proviso that $a+d=2$.

The following compounds are specifically mentioned as examples of compounds within one or more of the formulas noted above: 1,3- and 1,4-dicyanatobenzene, 2-tert.-butyl-1,4-dicyanatobenzene, 2,4-dimethyl-1,3-dicyanatobenzene, 2,5-di-tert.-butyl-1,4-dicyanatobenzene, tetramethyl-1,4-dicyanatobenzene, 2,4,6-trimethyl-1,3-dicyanatobenzene, 4-chloro-1,3-dicyanatobenzene, 1,3-, 1,4-, 1,5-, 1,6-, 1,7-, 1,8-, 2,6-, 2,7-dicyanatonaphthaline, 1,3,5-tricyanatobenzene; 4,4'-dicyanatodiphenyl, 2,2'-dicyanatodiphenyl, 3,3',5,5'-tetramethyl-4,4'-dicyanatodiphenyl, 3,3',5,5'-tetrachloro-4,4'-dicyanatodiphenyl, 3,3',5,5'-tetrachloro-2,2'-dicyanatodiphenyl, 2,2',6,6'-tetrachloro-4,4'-dicyanatodiphenyl, 4,4'-bis-[(3-cyanato)-phenoxy]-diphenyl, 4,4'-bis-[(4-cyanato)-phenoxy]-diphenyl, 2,2'-dicyanato-1,1'-binaphthyl; 4,4'-dicyanatodiphenyl ether, 3,3',5,5'-tetramethyl-4,4'-dicyanatodiphenyl ether, 3,3',5,5'-tetrachloro-4,4'-dicyanatodiphenyl ether, 4,4'-bis-[p-cyanatophenoxy]-diphenyl ether, 4,4'-bis-[p-cyanatophenylisopropyl]-diphenyl ether, 4,4'-bis-[p-cyanatophenoxy]-benzene, 4,4'-bis-[m-cyanatophenoxy]-diphenyl ether, 4,4'-bis-[4-(4-cyanatophenoxy)-phenyl sulphone]-diphenyl ether; 4,4'-dicyanatodiphenyl sulphone, 3,3',5,5'-tetramethyl-4,4'-dicyanatodiphenyl sulphone, 3,3',5,5'-tetrachloro-4,4'-dicyanatodiphenyl sulphone, 4,4'-bis-[p-cyanatophenylisopropyl]-diphenyl sulphone, 4,4'-bis-[(4-cyanato)-phenoxy]-diphenyl sulphone, 4,4'-bis-[(3-cyanato)-phenoxy]-diphenyl sulphone, 4,4'-bis-[4-(4-cyanatophenylisopropyl)-phenoxy]-diphenyl sulphone, 4,4'-bis-[4-cyanatophenyl sulphone)-phenoxy]-diphenyl sulphone, 4,4'-bis-[4-(4-cyanato)-diphenoxy]-diphenyl sulphone; 4,4'-dicyanatodiphenyl methane, 4,4'-bis-[p-cyanatophenyl]-diphenyl methane, 2,2-bis-(p-cyanatophenyl)-propane, 2,2-bis-(3,5-dimethyl-4-cyanatophenyl)-propane, 2,2-bis-(3,5-dichloro-4-cyanatophenyl)-propane, 1,1-bis-[p-cyanatophenyl]-cyclohexane, bis-[2-cyanato-1-naphthyl]-methane, 1,2-bis-[p-cyanatophenyl]-1,1,2,2-tetramethyl ethane, 4,4'-dicyanatobenzophenone, 4,4'-bis-(4-cyanato)-phenoxybenzophenone, 1,4-bis-[p-cyanatophenylisopropyl]-benzene, 2,2',5,5'-tetracyanatodiphenyl sulphone; polycyanic acid esters of novolaks (reaction products of phenol or alkyl- or halogen-substituted phenols with formaldehyde in acid solution) having from 3 to 5 OCN-groups and the like.

It is, of course, also possible in accordance with the present invention to use the partially crosslinked polyfunctional cyanic acid esters described above (e.g. British Pat. No. 1,305,762 and German Offenlegungsschrift No. 2,360,709) described above. As mentioned above, such products are obtained, for example, by heating the difunctional or polyfunctional cyanic acid esters described above to from about 50° to 350° C., optionally in the presence of a catalyst, until a prepolymer has formed, or in accordance with German Offenlegungsschrift No. 2,360,709 by condensing aromatic polyhydroxyl compounds with cyanuric chloride, followed by reaction with a halogen cyanide.

If, in accordance with the present invention, it is intended to use particularly pure, polyfunctional cyanic acid esters which show high stability in storage, it is advisable to use the products of the type described in German Offenlegungsschrift Nos. 2,529,486 and 2,529,487. In the process according to German Offenlegungsschrift No. 2,529,486, di- or polytrialkyl ammonium phenolates are reacted with an excess of a halogen cyanide in an organic solvent, optionally in the presence of catalytic quantities of trialkyl amines, to form the corresponding aromatic cyanic acid esters. According to German Offenlegungsschrift No. 2,529,487, pure aromatic cyanic acid esters are obtained by reacting alkali metal or alkaline earth metal salts of aromatic polyhydroxyl compounds with cyanogen halide in a solvent, optionally in the presence of catalytic quantities of a tertiary amine.

Both low molecular weight and relatively high molecular weight polyols containing from 2 to 8, preferably 2 or 3, hydroxyl groups may be used for the reaction with the difunctional or polyfunctional cyanic acid esters in the first stage of the process according to the present invention. Suitable low molecular weight polyhydroxyl compounds include, for example, ethylene glycol, 1,1- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, trimethylol ethane, pentaerythritol, quinitol, mannitol and sorbitol, diethylene glycol, triethylene glycol, tetraethylene glycol, polyethylene glycols having a molecular weight of up to 400, dipropylene glycol, polypropylene glycols having a molecular weight of up to 400, dibutylene glycol, polybutylene glycols having a molecular weight of up to 400, castor oil, 4,4'-dihydroxy diphenyl propane, dihydroxy methyl hydroquinone, 1,4-phenylene-bis-($\beta$-hydroxyethyl ether), ethanolamine, N-methyl ethanolamine, diethanolamine, N-methyl diethanolamine, triethanolamine, 3-aminopropanol, and ester diols corresponding to the following general formula:

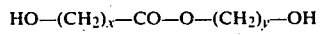

and

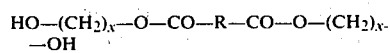

wherein

R represents an alkylene or arylene radical having from 1 to 10 carbon atoms, and preferably from 2 to 6 carbon atoms, x represents a number from 2 to 6 and y represents a number from 3 to 5.

Examples include δ-hydroxybutyl-ε-hydroxy caproic acid ester, ω-hydroxyhexyl-γ-hydroxy butyric acid ester, adipic acid-bis-(β-hydroxyethyl)-ester and terephthalic acid-bis-(β-hydroxyethyl)-ester.

Diol urethanes corresponding to the following general formula may also be used:

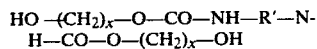

HO—(CH₂)ₓ—O—CO—NH—R'—NH—CO—O—(CH₂)ₓ—OH wherein

R' represents an alkylene, cycloalkylene or arylene radical having from 2 to 15 carbon atoms, preferably from 2 to 6 carbon atoms, and x represents a number of from 2 to 6.

Examples include 1,6-hexamethylene-bis-(β-hydroxyethyl urethane) or 4,4'-diphenyl methane-bis-(δ-hydroxybutyl urethane).

Diol ureas corresponding to the following general formula may also be used:

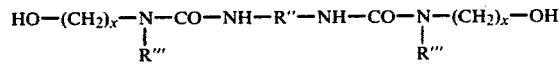

wherein

R'': represents an alkylene cycloalkylene or arylene radical having from 2 to 15 carbon atoms, preferably from 2 to 9 carbon atoms, R''': represents H or CH₃ and x: represents 2 or 3. Suitable materials include, for example 4,4'-diphenyl methane-bis-(β-hydroxyethyl urea) or the compound:

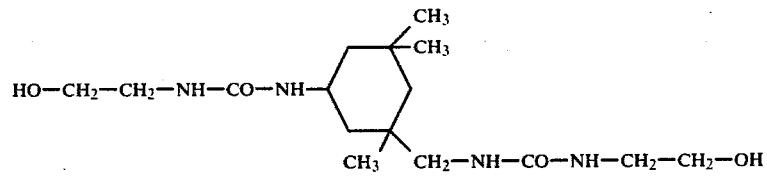

Suitable relatively high molecular weight polyhydroxyl compounds (e.g. molecular weight from 400 to 10,000) include for example, polyesters, polyethers, polythio ethers, polyacetals, polycarbonates and polyester amides containing from 2 to 8 hydroxyl groups.

The polyesters containing hydroxyl groups suitable for use in accordance with the present invention include, for example, reaction products of polyhydric, preferably dihydric, and, optionally, even trihydric alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example by halogen atoms, and/or may be unsaturated. Examples of such polycarboxylic acids are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester and terephthalic acid-bis-glycol ester. Suitable polyhydric alcohols are, for example, ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bis-hydroxymethyl cyclohexane), 2-methyl-1,3-propane diol, glycerol, trimethylol propane, 1,2,6-hexane triol, 1,2,4-butane triol, trimethylol ethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones, for example ε-caprolactone, or hydroxy carboxylic acids, for example ω-hydroxy caproic acid, may also be used.

The polyethers containing at least two, generally from two to eight and preferably two or three hydroxyl groups suitable for use in accordance with the present invention are also known and may be obtained, for example, by polymerizing epoxides, such as ethylene oxide, propylene oxide, butylene oxide, tetrahydrofuran, styrene oxide or epichlorhydrin, on their own, for example in the presence of BF₃, or by the addition of these epoxides, optionally in admixture or in succession, to starter components containing reactive hydrogen atoms, such as water, alcohols or amines. Examples of starter components include ethylene glycol, 1,3- or 1,2-propylene glycol, trimethylol propane, 4,4'-dihydroxy diphenyl propane, aniline, ammonia, ethanolamine, ethylene diamine. Sucrose polyethers of the type described, for example, in German Auslegeschrift Nos. 1,176,358 and 1,064,938 may also be used in accordance with the present invention. In many cases, it is preferred to use polyethers of the type which contain predominant amounts of primary OH-groups (up to 90%, by weight, based on all the OH-groups present in the polyether). Polyethers modified by vinyl polymers, of the type formed, for example, by polymerizing styrene and acrylonitrile in the presence of polyethers (U.S. Pat. Nos. 3,383,351; 3,304,273; 3,523,093 and 3,110,695, and German Pat. No. 1,152,536), are also suitable, as are polybutadienes containing OH-groups.

Among the polythioethers, reference is made in particular to the condensation products of thiodiglycol on its own and/or with other glycols, dicarboxylic acids, formaldehyde, aminocarboxylic acids or amino alcohols. Depending upon the co-components, the products are polythio mixed ethers, polythio ether esters or polythio ether ester amides.

Suitable polyacetals include, for example, the compounds obtainable from glycols, such as diethylene glycol, triethylene glycol, 4,4'-dioxethoxy diphenyl dimethyl methane and hexane diol, and formaldehyde. Polyacetals suitable for use in accordance with the present invention may also be obtained by polymerizing cyclic acetals.

Suitable polycarbonates containing hydroxyl groups are known polycarbonates which may be obtained, for example, by reacting diols, such as 1,3-propane diol, 1,4-butane diol and/or 1,6-hexane diol, diethylene glycol, triethylene glycol and tetraethylene glycol, with diaryl carbonates (for example diphenyl carbonate) or phosgene.

The polyester amides and polyamides include, for example, the predominantly linear condensates obtained from polybasic saturated and unsaturated carboxylic acids or the anhydrides thereof and polyhydric saturated and unsaturated amino alcohols, diamines, polyamines and mixtures thereof.

Polyhydroxyl compounds already containing urethane or urea groups and optionally modified natural polyols, such as castor oil, carbohydrates, starch, may also be used. Addition products of alkylene oxides with phenol-formaldehyde resins or even with urea-formaldehyde resins may also be used in accordance with the present invention.

Representatives of these compounds suitable for use in accordance with the present invention are known and are described, for example, in High Polymers, Vol. XVI, "Polyurethanes, Chemistry and Technology", by Saunders-Frisch, Interscience Publishers, New York, London, Vol. I, 1962, pages 32–42 and pages 44–54, and Vol. II, 1964, pages 5–6 and 198–199, and in Kunststoff-Handbuch, Vol. VII, Vieweg-Höchtlen, Carl-Hanser-Verlag, Munich, 1966, pages 45 to 71.

According to the present invention, mixtures of the above-mentioned polyhydroxyl compounds may of course also be used. It is also possible to use polyurethanes containing hydroxyl groups having molecular weights of up to about 10,000, of the type which may be obtained by reacting the above-mentioned polyhydroxyl compounds with a sub-equivalent quantity of one or more of the polyisocyanates described below. According to the present invention, it is preferred to use polyesters, polyethers or polyurethanes having 2 or 3 hydroxyl groups and molecular weights of from 500 to 10,000, and preferably from 800 to 5,000.

In the first stage of the process according to the present invention, cyanic acid esters and polyhydroxyl compounds are reacted, either as such or in solution, by heating for from about 0.5 to 5 hours, preferably for from 1.5 to 3 hours, to a temperature of from about 30° to 250° C., preferably from 50° to 150° C., optionally in the presence of a catalyst, to form partially crosslinked prepolymers which are still soluble in organic solvents. The quantitative ratios between the starting components may vary within wide limits. In general, the ratio, by weight, of cyanic acid esters to polyols is from about 15:1 to 1:25, preferably from 10:1 to 1:15 and, with particular preference, from 2:1 to 1:5.

The equivalent ratio of cyanic acid ester to polyol may vary within even wider limits (depending upon the molecular weight of the polyol). It is generally from 200:1 to 1:10, preferably from 50:1 to 1:4 and, with particular preference, from 15:1 to 1:2.

In addition to iminocarboxylic acid ester groups, the prepolymers preferably contain an average of from about 0.5 to 3 and, with particular preference, from 1 to 2 triazine rings per molecule and, in addition, may optionally contain free cyanate groups as well. The thus-modified polyols are liquid, wax-like or solid products which are still soluble in organic solvents and show a high stability in storage. They are also the subject of the present invention.

In a particular embodiment of the process according to the present invention, these prepolymers according to the present invention, optionally after the addition of more polyol, may be converted by heating, either as such or in solution, for from about 2 to 10 hours, preferably for from 4 to 7 hours, to a temperature of from about 100° to 350° C., preferably to from 120° to 250° C., optionally in the presence of a catalyst, in known manner (cf. for example German Auslegeschrift No. 1,190,184) into high molecular weight polymers of triazine structure. In this case, the end products are substantially insoluble in solvents and are infusible. This procedure is of particular interest in cases where polyether polyols are reacted with aromatic cyanic acid esters, because moldings of two inseparable layers differing in their elasticity are surprisingly formed in this way. Products such as these are of interest as composite materials produced in situ for various technological applications. In this embodiment of the process according to the present invention, it is of course not necessary to isolate the prepolymer formed as intermediate product. In other words, the end product (polytriazine) may be produced in a single operation.

Catalysts suitable for use in the production of the prepolymer and the high molecular weight end polymer containing triazine structures according to the present invention are acids, bases, salts, nitrogen and phosphorus compounds, and include Lewis acids, such as $AlCl_3$, $BF_3$, $FeCl_3$, $TiCl_4$, $ZnCl_2$ and $SnCl_4$; proton acids, such as HCl and $H_3PO_4$; aromatic hydroxy compounds, such as phenol, p-nitrophenol, pyrocatechol and dihydroxy naphthalene; sodium hydroxide, sodium methylate, sodium phenolate, trimethylamine, triethylamine, tributylamine, diazabicyclo-(2,2,2)-octane, quinoline, isoquinoline, tetrahydroisoquinoline, tetraethyl ammonium chloride, pyridine-N-oxide, tributyl phosphine, phospholine-$\Delta^3$-1-oxa-1-phenyl, zinc octoate, tin octoate, and zinc naphthenate; and mixtures thereof.

The catalysts may be used in quantities of from 0.001 to 10%, by weight, based on prepolymer or on aromatic cyanic acid ester, or, if desired, in even larger quantities.

Suitable inert solvents are, for example, acetone, benzene, xylene, chlorobenzene, ethylacetate, tetrahydrofuran, dibutyl ether and dimethyl formamide.

However, it is preferred to convert the prepolymers containing hydroxyl groups according to the present invention into crosslinked polyurethanes containing triazine rings and tri-substituted bis-oxymethylene-urea groups in known manner by reaction with polyisocyanates and, optionally, other compounds containing isocyanate-reactive groups, optionally in the presence of the catalysts, blowing agents and other additives known from polyurethane chemistry. In general, the polyisocyanate is used in such a quantity that the equivalent ratio between NCO-groups and isocyanate-reactive groups amounts to from about 0.4 to 1.25, preferably to from 0.8 to 1.20 and, with particular preference, to from 0.9 to 1.15. However, it is of course also possible to use smaller quantities of isocyanate for particular applications.

In this connection, it should be noted that the iminocarboxylic acid ester groups present in the prepolymers according to the present invention are also isocyanate-reactive groups.

According to the present invention, it is possible to use any aliphatic, cycloaliphatic, araliphatic, aromatic and heterocyclic polyisocyanates of the type generally known and described, for example, by W. Siefken in Justus Liebigs Annalen der Chemie, 562, pages 75 to 136. Examples include ethylene diisocyanate, 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl cyclohexane (U.S. Pat. No. 3,401,190); 2,4- and 2,6-hexahydrotolylene diisocyanate and mixtures of these isomers; hexahydro-1,3- and/or 1,4-phenylene diisocyanate; perhydro-2,4′- and/or -4,4′-diphenyl methane diisocyanate; 1,3- and 1,4-phenylene diisocyanate; 2,4- and 2,6-tolylene diisocyanate and mixtures of these isomers; diphenyl methane-2,4′- and/or -4,4′-diisocyanate; naphthylene-1,5-diisocyanate; triphenyl methane-4,4′,4″-triisocyanate; polyphenyl polymethylene polyisocyanates, of the type which may be obtained by condensing aniline with formaldehyde, followed by phosgenation, and which are described for example in British Pat. Nos. 874,430 and 848,671; m- and p-isocyanatophenyl sulphonyl isocyanates as described in U.S. Pat. No. 3,454,606; perchlorinated aryl polyisocyanates of the type decribed, for example, in U.S. Pat. No. 3,277,138; polyisocyanates containing carbodiimide groups of the type described in U.S. Pat. No. 3,152,162; diisocyanates of the type described in U.S. Pat. No. 3,492,330; polyisocyanates containing allophanate groups of the type described, for example, in British Pat. No. 994,890, Belgian Pat. No. 761,626 and published Dutch Patent Application No. 7,012,524; polyisocyanates containing isocyanurate groups of the type described, for example, in U.S. Pat. No. 3,001,973, German Pat. No. 1,022,789; 1,222,067 and 1,027,394 and in German Offenlegungsschriften Nos. 1,929,034 and 2,004,048; polyisocyanates containing urethane groups of the type described, for example, in Belgian Pat. No. 752,261 or in U.S. Pat. No. 3,394,164; polyisocyanates containing acylated urea groups as described in German Pat. No. 1,230,778; polyisocyanates containing biuret groups of the type described, for example, in U.S. Pat. Nos. 3,124,605 and 3,201,372 and in British Pat. No. 889,050; polyisocyanates obtained by telomerization reactions of the type described, for example, in U.S. Pat. No. 3,654,106; polyisocyanates containing ester groups of the type described, for example, in British Pat. Nos. 965,474 and 1,072,956, in U.S. Pat. No. 3,567,763 and in German Pat. No. 1,231,688; reaction products of the above-mentioned isocyanates with acetals as described in German Pat. No. 1,072,385; and polyisocyanates containing polymeric fatty acid radicals as described in U.S. Pat. No. 3,455,883.

It is also possible to use the isocyanate-group-containing distillation residues obtained in the production of isocyanates on a commercial scale, optionally in solution in one or more of the aforementioned polyisocyanates. It is, of course, possible to use mixtures of the aforementioned polyisocyanates.

In general, it is preferred to use the readily available polyisocyanates such as 2,4- and 2,6-tolylene diisocyanate, and mixtures of these isomers ("TDI"); polyphenyl polymethylene polyisocyanates of the type obtained by condensing aniline with formaldehyde, followed by phosgenation ("crude MDI"); and, polyisocyanates containing carbodiimide groups, urethane groups, allophanate groups, isocyanurate groups, urea groups or biuret groups ("modified polyisocyanates").

In addition to the polyols described above, suitable compounds containing isocyanate-reactive groups which may optionally be used in accordance with the present invention include aliphatic and aromatic diamines.

Aliphatic diamines suitable for use in accordance with the present invention include, for example, ethylene diamine; 1,4-tetramethylene diamine; 1,11-undecamethylene diamine; 1,12-dodecamethylene diamine and mixtures thereof; 1-amino-3,3,5-trimethyl-5-aminomethyl cyclohexane; 2,4- and 2,6-hexahydrotolylene diamine and mixtures thereof; perhydro-2,4′- and 4,4′-diamino-diphenyl methane; p-xylylene diamine; bis-(3-aminopropyl)-methylamine, and the like. Hydrazine and substituted hydrazines, for example methylhydrazine, N,N′-dimethylhydrazine and their homologues, as well as acid dihydrazides may also be used in accordance with the present invention. Examples include carbodihydrazide, oxalic acid dihydrazide, the dihydrazides of malonic acid, succinic acid, glutaric acid, adipic acid, β-methyl adipic acid, sebacic acid, hydracrylic acid and terephthalic acid, semicarbazido-alkylenehydrazides, such as β-semicarbazidopropionic acid hydrazide (German Offenlegungsschrift No. 1,770,591), semicarbazidoalkylene carbazinic esters, such as 2-semicarbazidoethyl carbazinic ester (German Offenlegungsschrift No. 1,918,504) or even aminosemicarbazide compounds, such as β-aminoethyl semicarbazidocarbonate (German Offenlegungsschrift No. 1,902,931).

Examples of aromatic diamines include the bisanthranilic acid esters as described in German Offenlegungschriften Nos. 2,040,644 and 2,160,590; 3,5- and 2,4-diaminobenzoic acid esters as described in German Offenlegungsschrift No. 2,025,900; the ester-group-containing diamines described in German Offenlegungsschriften Nos. 1,803,635; 2,040,650 and 2,160,589; 3,3′-dichloro-4,4′-diaminodiphenyl methane, tolylene diamine, 4,4′-diaminodiphenyl methane, 4,4′-diaminodiphenyl disulphide, and the like.

According to the present invention, suitable chain extenders also include such compounds as 1-mercapto-3-aminopropane, substituted or unsubstituted amino acids, for example glycine, alanine, valine, serine and lysine, and substituted or unsubstituted dicarboxylic acids, for example succinic acid, adipic acid, phthalic acid, 4-hydroxy phthalic acid and 4-aminophthalic acid.

It is also possible to use compounds which are monofunctional with respect to isocyanates in proportions of from 0.01 to 10%, by weight, based on polyurethane solids, as so-called "chain terminators". Monofunctional compounds of this type include, for example, monoamines, such as butyl and dibutylamine, octylamine, stearylamine, N-methyl stearylamine, pyrrolidine, piperidine and cyclohexylamine, monohydric alcohols such as butanol, 2-ethyl hexanol, octanol, dodecanol, the various amyl alcohols, cyclohexanol, ethylene glycol monoethyl ether, and the like.

In the production of polyurethanes, water and/or readily volatile halogen-substituted alkanes, such as methylene chloride, chloroform, ethylidene chloride, vinylidene chloride, monofluorotrichloromethane, chlorodifluoromethane, dichlorodifluoromethane, also butane, hexane, heptane or diethyl ether, may optionally be used in the second stage of the process according to the present invention. A blowing effect may also be obtained by adding compounds which decompose at temperatures above room temperature giving off gases (for example nitrogen) such as azo compounds (such as azoisobutyronitrile). Other examples of blowing agents and information on the use of blowing agents are known and may be found in Kunststoff-Handbuch, Vol. VII, by Vieweg and Höchtlen, Carl-Hanser-Verlag, Munich 1966, pages 108 and 109, 453 to 455 and 507 to 510.

According to the present invention, polyurethane catalysts are also frequently used. Examples of suitable known catalysts include tertiary amines, such as triethylamine, tributylamine, N-methyl morpholine, N-ethyl morpholine, N-cocomorpholine, N,N,N',N'-tetramethyl ethylene diamine, 1,4-diazabicyclo-(2,2,2)-octane, N-methyl-N'-dimethyl aminoethyl piperazine, N,N-dimethyl benzylamine, bis-(N,N-diethylaminoethyl)-adipate, N,N-dimethyl benzylamine, pentamethyl diethylene triamine, N,N-dimethyl cyclohexylamine, N,N,N',N'-tetramethyl-1,3-butane diamine, N,N-dimethyl-$\beta$-phenyl ethylamine, 1,2-dimethyl imidazole and 2-methyl imidazole. Other suitable catalysts are known Mannich bases of secondary amines, such as dimethylamine, and aldehydes, preferably formaldehyde, or ketones, such as acetone, methyl ethyl ketone, cyclohexanone, and phenols, such as phenol, nonylphenol or bisphenol.

Tertiary amine catalysts containing isocyanate-reactive hydrogen atoms such as triethanolamine, triisopropanolamine, N-methyl diethanolamine, N-ethyl diethanolamine, N,N-dimethyl ethanolamine, and the reaction products thereof with alkylene oxides, such as propylene oxide and/or ethylene oxide, may also be used.

Other suitable catalysts are silaamines containing carbon-silicon bonds of the type described, for example, in U.S. Pat. No. 3,620,984. Examples include 1,2,4-trimethyl-2-silamorpholine and 1,3-diethyl aminomethyl tetramethyl disiloxane.

Other suitable catalysts are nitrogen-containing bases, such as tetraalkyl ammonium hydroxides, alkali metal hydroxides, such as sodium hydroxide, alkali metal phenolates, such as sodium phenolate, or alkali metal alcoholates, such as sodium methylate. Hexahydrotriazines may also be used as catalysts.

According to the present invention, organometallic compounds, especially organo tin compounds may also be used as catalysts. Preferred organo tin compounds are tin(II)salts of carboxylic acids, such as tin(II)acetate, tin(II)octoate, tin(II)ethyl hexoate and tin(II)laurate, and the tin(IV)compounds, such as dibutyl tin oxide, dibutyl tin dichloride, dibutyl tin diacetate, dibutyl tin dilaurate, dibutyl tin maleate and dioctyl tin diacetate. It is, of course, possible to use the above-mentioned catalysts in the form of mixtures.

Further representatives of catalysts suitable for use in accordance with the present invention and details on the way in which the catalysts work are known and may be found in Kunststoff-Handbuch, Vol. VII, by Vieweg and Höchtlen, Carl-Hanser-Verlag, Munich, 1966, pages 96 to 102.

The catalysts are generally used in quantities of from about 0.001 to 10%, by weight, based on the prepolymer according to the present invention.

According to the present invention, surface-active additives, such as emulsifiers and foam stabilizers, may also be used. Examples of emulsifiers are the sodium salts of castor oil sulphonates or salts of fatty acids with amines, such as diethylamine/oleic acid or diethanolamine/stearic acid. Alkali metal or ammonium salts of sulphonic acids, such as those of dodecyl benzene sulphonic acid or dinaphthyl methane disulphonic acid or of fatty acids, such as ricinoleic acid, or of polymeric fatty acids, may also be used as surface-active additives.

Suitable foam stabilizers include polyether siloxanes, especially the water-soluble types. These compounds are generally of such structure that a copolymer of ethylene oxide and propylene oxide is attached to a polydimethyl siloxane radical. Foam stabilizers of this type are described, for example, in U.S. Pat. Nos. 2,834,748; 2,917,480 and 3,629,308.

According to the present invention, it is also possible to use reaction retarders (for example substances which are acid in reaction, such as hydrochloric acid or organic acid halides); cell regulators, such as paraffins or fatty alcohols or dimethyl polysiloxanes; pigments or dyes; flameproofing agents such as tris-chlorethyl phosphate, tricresyl phosphate or ammonium phosphate and polyphosphate; stabilizers against the effects of ageing and weather; plasticizers; substances having fungistatic and bacteriostatic effects; and fillers, such as barium sulphate, kieselguhr, carbon black or prepared chalk.

Other examples of useful surface-active additives, foam stabilizers, cell regulators, reaction retarders, stabilizers, flameproofing substances, plasticizers, dyes and fillers and substances having fungistatic and bacteriostatic effects and also details on the way in which these additives are to be used and how they work, are known and may be found in Kunststoff-Handbuch, Vol. VII, published by Vieweg and Höchtlen, Carl-Hanser-Verlag, Munich, 1966, on pages 103 to 113.

In the above described embodiment of the process according to the present invention, the polyisocyanates and the prepolymers according to the present invention and also the other reaction components optionally used can be reacted by the known single-stage process, by the prepolymer process or by the semi-prepolymer process, in many cases using machines of the type described, for example, in U.S. Pat. No. 2,765,565. Particulars of processing equipment suitable for use in accordance with the present invention may be found, for example, on pages 121 and 205 of Kunststoff-Handbuch, Vol. VII, published by Vieweg and Höchtlen, Carl-Hanser-Verlag, Munich 1966.

In the production of foams, the foaming reaction is preferably carried out in molds in accordance with the present invention. To this end, the reaction mixture is introduced into a mold. Suitable mold materials are metals, for example aluminium, or plastics, for example epoxide resins. Inside the mold, the foamable reaction mixture foams and forms the molding. In-mold foaming may be carried out in such a way that the molding has a cellular structure at its surface, or even in such a way that the molding has a compact skin and a cellular core. According to the present invention, it is possible in this connection to introduce such a quantity of foamable reaction mixture into the mold that the foam formed just fills the mold. However, it is also possible to introduce into the mold more foamable reaction mixture than is required for filling the mold with foam. This technique is known as "overcharging" and is described, for example, in U.S. Pat. Nos. 3,178,490 and 3,182,104.

Known "external release agents", such as silicone oils, are frequently used for in-mold foaming. However, it is also possible to use so-called "internal release agents", optionally in admixture with external release agents, such as described in German Offenlegungsschriften Nos. 2,121,670 and 2,307,589.

According to the present invention, cold-hardening foams may also be produced (cf. British Pat. No. 1,162,517, German Offenlegungsschrift No. 2,153,086).

It is, of course, also possible to produce foams by block foaming or by the known laminator process.

Fillers or reinforcing materials may, of course, also be used in the present invention. These substances may be added either before or during the process in basically any way. Fillers and reinforcing materials which may optionally be used in accordance with the present invention are, quite generally, any powdered or granular and/or fibrous products, for example, those of the type also used in the production of moldings based on unsaturated polyester resins or epoxide resins. Such fillers and/or reinforcing materials include, in particular, granular fillers, such as quartz powder, slate powder, asbestos powder, powdered corundum, chalk, iron powder, aluminium powder, sand, gravel and other fillers of this type; inorganic or organic fibers, especially glass fibers in the conventional textile forms of fibers, filaments, rovings, yarns, non-woven structures, mats, woven structures, and the like. Similarly, corresponding textile structures of organic, preferably synthetic fibers (polyamides, polyesters) or based on quartz, carbon, metals, and the like and also monocrystals (whiskers), may also be used.

The end products containing fillers or reinforcing materials may be used, in particular, in the construction of vessels and pipes by the winding technique, in electrical engineering, in mold and tool making and also in the construction of heavy-duty components, in the construction of so-called "lightweight" vehicles and also in air and space travel.

The percentages and parts quoted in the Examples are based on weight, unless otherwise stated.

EXAMPLES

EXAMPLE 1

90 parts of a polypropylene glycol (OH-number 112) are mixed with 10 parts of bis-2,2-(4-cyanatophenyl)-propane and stirred for 1 hour at 120° C. A prepolymer exhibiting bands characteristic of the cyanic ester group (at 4.5$\mu$) and of the iminocarboxylic acid ester group (at 5.9$\mu$) in its IR-spectrum is obtained.

20 g of the thus-obtained prepolymer are hardened by heating for 5 hours at 160° C. A composite material of two inseparable layers is formed. One layer consists of a jelly-like mass while the second layer consists of a hard, elastic substance.

EXAMPLE 2

70 parts of polyethylene glycol (OH-number 80) are mixed with 30 parts of resorcinol dicyanate and the resulting mixture heated for 1.5 hours at 100° C. 20 g of the thus-obtained prepolymer are hardened by heating for 5 hours at 150° C. to form a two-phase composite plastic material of which one layer is flexible and elastic and its second layer rigid and elastic.

EXAMPLE 3

20 parts of the polyether used in Example 1 are mixed with 80 parts of bis-2,2-(4-cyanatophenyl)-propane and the resulting mixture heated for 2 hours at 120° C. Following the addition of 50 mg of zinc octoate, 20 g of the thus-obtained prepolymer are hardened by heating for 5 hours at 160° C. to form a plastic material consisting of two inseparable layers, one layer consisting of a very hard substance and the other layer of an elastic substance.

EXAMPLE 4

50 parts of polytetramethylene glycol (OH-number 56) are mixed with 50 parts of bis-2,2-(3,5-dimethyl-4,4-cyanatophenyl)-propane and the resulting mixture heated for 2.5 hours at 120° C. 20 g of the thus-obtained prepolymer are hardened by heating for 5 hours at 170° C. in the presence of 0.01% by weight of tin octoate to form a two-layer plastic material of which one layer consists of a hard substance and the other layer of a flexible substance, the two layers being inseparable.

EXAMPLE 5

30 parts of polypropylene glycol (OH-number 56) and 70 parts of 4,4'-dicyanatodiphenyl are thoroughly mixed and the mixture heated for 2 hours at 125° C. 20 g of the thus-obtained prepolymer are hardened by heating for 4 hours at 150° C. in the presence of 0.1% by weight of a mixture of pyrocatechol and diazabicyclo-(2,2,2)-octane (mixing ratio 1:1) to form a two-layer composite material of which one layer consists of a very hard substance and its other layer of an elastic substance. The two layers are inseparable.

EXAMPLE 6

40 parts of polytetramethylene glycol (OH-number 56) and 60 parts of 4,4'-dicyanatodiphenyl sulphone are mixed and the resulting mixture heated for 2.5 hours at 130° C. 20 g of the thus-obtained prepolymer are hardened by heating for 4 hours at from 160° to 170° C. in the presence of 0.05% by weight of zinc octoate to form a composite material of which one layer consists of a hard substance and its other layer of a flexible substance.

EXAMPLE 7

100 g of bis-2,2-(4-cyanatophenyl)-propane are stirred for 5 hours at 150° C. The material obtained after cooling shows the band characteristic of the OCN-group at 4.5$\mu$, in addition to the bands typical of the s-triazine ring at 6.4$\mu$ and 7.25$\mu$, in its IR-spectrum.

9 g of the prepolymer are mixed with 21 g of polypropylene glycol (OH-number 112) and the resulting mixture heated for 6 hours at 160° C. A two-layer composite material is obtained of which one layer consists of a flexible, rubber-like mass and its other layer of an elastic, hard substance.

EXAMPLE 8

100 g of resorcinol dicyanate are stirred for 3 hours at 130° C., after which the reaction mixture is cooled. 10 g of the thus-obtained prepolymer are mixed with 10 g of polyethylene glycol (OH number 80) and the resulting mixture heated for 5 hours at 150° C. A composite material is obtained, consisting of a rubber-like layer and a hard elastic layer which are inseparable from one another.

EXAMPLE 9

100 g of bis-2,2-(3,5-dimethyl-4-cyanatophenyl)-propane are heated with stirring for 7 hours at 140° C. following the addition of 0.04% of zinc octoate. 12 g of the thus-obtained prepolymer are heated for 7 hours at 170° C. with 8 g of polytetramethylene glycol (OH number 56). A two-layer composite material is obtained, consisting of a solid rubber-like layer and of a very hard elastic layer.

EXAMPLE 10

10 parts of the prepolymer of Example 1 are mixed with 10 parts of the prepolymer of Example 7 and the resulting mixture heated for 6 hours at 160° C. A composite material is obtained, consisting of a soft rubber-like layer and of a hard elastic layer which are inseparable from one another.

EXAMPLE 11

95 parts of a polyester produced from 1,4-butane diol, ethylene glycol and adipic acid (hydroxyl number 55) and 5 parts of bis-2,2-(4-cyanatophenyl)-propane, were dissolved with 10 mg of zinc octoate in 100 ml of methyl ethyl ketone. A clear solution is obtained. The solvent is distilled off and the residues of the methyl ethyl ketone removed at 90° C. in a water jet vacuum. The thus-obtained clear melt is then heated for 3 hours at 140° C. A light, tough resin which is completely soluble in organic solvents (for example acetone, methyl ethyl ketone, toluene, DMF) is obtained after cooling. The IR-spectrum of the resin no longer shows the band characteristic of the —OCN-group at 4.5μ, but shows weak s-triazine bands at 6.4μ and 7.25μ.

EXAMPLE 12

75 parts of the polyester used in Example 11 are dissolved in 100 ml of acetone with 25 parts of bis-2,2-(4-cyanatophenyl)-propane and 50 mg of zinc octoate. The solvent is then distilled off and residues of acetone are removed in a water jet vacuum at 90° C. The thus-obtained clear melt is then heated for 2 hours to 150° C. A jelly-like mass is obtained after cooling, being completely soluble in organic solvents, such as acetone, methyl ethyl ketone, dimethyl formamide or dimethyl sulphoxide. In addition to the —OCN-band at 4.5μ the IR-spectrum also shows the s-triazine bands at 6.4μ and 7.25μ.

EXAMPLE 13

90 parts of the polyester used in Example 11 are dissolved in 10 parts of resorcinol dicyanate in 100 ml of methylene chloride. The solvent is then distilled off. Residues of the methylene chloride are removed in a water jet vacuum at 90° C. A clear melt is obtained and is subsequently heated for 4 hours at 160° C. After cooling, a slowly hardening mass is obtained which is completely soluble in organic solvents, such as acetone, methyl ethyl ketone, dimethyl formamide or dimethyl sulphoxide. As its IR-spectrum shows, this prepolymer does not contain any —OCN-groups, but instead contains the bands characteristic of the s-triazine ring at up to 6.4μ and 7.25μ.

EXAMPLE 14

80 parts of a polyester produced from adipic acid and propylene glycol (hydroxyl number 65) are dissolved with 20 parts of 1,1-bis-(4-cyanatophenyl)-cyclohexane in 100 ml of acetone. 10 mg of a mixture of pyrocatechol and diazabicyclo-(2,2,2)-octane (1:1) are then stirred into this solution. The solvent is then distilled off and residues of the acetone are removed in a water jet vacuum at 90° C. The thus-obtained clear melt is heated to 130° C. for 2 hours. A rubber-like mass which is completely soluble in organic solvents is obtained after cooling. The IR-spectrum shows the bands characteristic of the —OCN-group at 4.5μ and the bands characteristic of the s-triazine ring at 6.4μ and 7.25μ.

EXAMPLE 15

90 parts of polycaprolactone (hydroxyl number 89) are dissolved with 10 parts of bis-2,2-(4-cyanato-3,5-dimethylphenyl)-propane at 50 mg of tin octoate in 100 ml of methyl ethyl ketone. The solvent is then distilled off and residues of the methyl ethyl ketone are removed in a water jet vacuum at 90° C. A clear melt is obtained and is then heated for 2 hours at 140° C. A tacky resin which is completely soluble in organic solvents is obtained after cooling. As shown by the infra-red spectrum, this prepolymer does not contain any —OCN-groups, but instead shows the bands characteristic of the s-triazine ring at 6.4μ and 7.25μ.

EXAMPLE 16

10 parts of an OH-prepolymer (OH number 20) produced from tolylene diisocyanate (isomer ratio 2,4-:2,6-=80:20) and the polyesters used in Example 14 are dissolved with 90 parts of bis-2,2-(4-cyanatophenyl)-propane in 100 ml of methylene chloride. After the addition of 10 mg of zinc octoate, the solvent is distilled off in a water jet vacuum at 80° C. A clear melt is obtained and is then heated for 1.5 hours at 140° C. A slowly hardening pale yellow mass which is completely soluble in organic solvents is obtained after cooling. The IR-spectrum of this prepolymer shows the bands characteristic of the —OCN-group at 4.5μ and the bands characteristic of the s-triazine ring at 6.4μ and 7.25μ.

EXAMPLE 17

90 parts of the OH-prepolymer used in Example 16 and 10 parts of bis-2,2-(4-cyanatophenyl)-propane dissolved in 100 ml of methyl ethyl ketone are thoroughly mixed with 50 mg of zinc octoate. The solvent is then removed in a water jet vacuum at 90° C. A clear melt is obtained and is then heated for 3 hours at 130° C. A colorless tough resin which is completely soluble in organic solvents is obtained after cooling. As shown by the IR-spectrum, no more free —OCN—groups are present.

EXAMPLE 18

30 parts of an OH-prepolymer (hydroxyl number 18), produced from 4,4'-diisocyanatodiphenylmethane and a polytetramethylene glycol (OH number 56), are dissolved with 70 parts of resorcinol dicyanate in 100 ml of toluene.

The solvent is then removed in a water jet vacuum at 90° C. A clear melt is obtained and is then heated for 1.5 hours at from 120° to 130° C. A prepolymer which is still soluble in the organic solvent is obtained after cooling, showing the IR-bands characteristic of the —OCN-group at 4.5μ and the bands characteristic of the s-triazine ring at 6.4μ and 7.25μ.

EXAMPLE 19

50 parts of the OH-prepolymer used in Example 18 are dissolved with 50 parts of bis-2,2-(3,5-dimethyl-4-cyanatophenyl)-propane and 50 mg of tin octoate in 100 ml of methylene chloride. After the solvent has been distilled off, residues of the dichloromethane are removed in a water jet vacuum at 90° C. A clear melt is obtained and is then heated for 2 hours at 120° C. After cooling, this prepolymer hardens slowly into a solid mass. As shown by the IR-spectrum, both free —OCN-groups and also s-triazine rings are present.

EXAMPLE 20

70 parts of an OH-prepolymer (hydroxyl number 25), produced from hexamethylene diisocyanate and the polyester used in Example 11, are dissolved with 30 parts of bis-1,1-(4-cyanatophenyl)-cyclohexane and 50 mg of zinc octoate in 100 ml of methyl ethyl ketone. The solvent is removed in a water jet vacuum at 90° C., leaving a clear melt which is then heated for 3 hours at 120° C. A rubber-like mass is obtained after cooling. The IR-spectrum of the thus-obtained prepolymer shows both free —OCN-groups and also s-triazine rings.

EXAMPLE 21

100 parts of an NCO-prepolymer (NCO-content=6.85%) of 4,4'-diisocyanatodiphenylmethane and the prepolymer of Example 1 are mixed at 100° C. with 6.67 parts of 1,4-butane diol (NCO/OH=1.10). The mixture remains pourable at this temperature for 150 seconds and may be mold-released after 240 seconds.

The following mechanical data are measured after tempering for 24 hours at 110° C.:

| tensile strength | (DIN 53504) | 21.0 MPa |
|---|---|---|
| elongation at break | (DIN 53504) | 219% |
| tear propagation resistance | (DIN 53515) | 232N |
| Shore-A-hardness | (DIN 53505) | 85 |
| elasticity | (DIN 53512) | 16% |

EXAMPLE 22

100 parts of an NCO-prepolymer (NCO content=5.77%) of 4,4'-diisocyanatodiphenyl methane and the prepolymer of Example 3 are mixed at 100° C. with 5.62 parts of 1,4-butane diol (NCO/OH=1.10). The mixture remains pourable for 120 seconds and may be mold-released after 360 seconds at 130° C. The following mechanical data are measured after tempering for 24 hours at 110° C.:

| tensile strength | (DIN 53504) | 18.8 MPa |
|---|---|---|
| elongation at break | (DIN 53504) | 238% |
| tear propagation resistance | (DIN 53515) | 292N |
| Shore-A-hardness | (DIN 53505) | 85 |
| elasticity | (DIN 53512) | 20% |

EXAMPLE 23

100 parts of an NCO-prepolymer (NCO-content=6.58%) of 4,4'-diisocyanatodiphenylmethane and the prepolymer of Example 2 are mixed at 100° C. with 6.4 parts of 1,4-butane diol (NCO/OH=1.10). The mixture remains pourable for 105 seconds and may be mold-released after 180 seconds at 130° C. The following mechanical data are measured after tempering for 24 hours:

| tensile strength | (DIN 53504) | 24 MPa |
|---|---|---|
| elongation at break | (DIN 53504) | 193% |
| tear propagation resistance | (DIN 53515) | 381 N |
| Shore-A-hardness | (DIN 53505) | 96 |
| elasticity | (DIN 53512) | 24% |

EXAMPLE 24

The procedure is as in Example 23, except that tin(II) octoate is used as catalyst for the polyisocyanate polyaddition reaction. The mixture remains pourable for 75 seconds and may be mold-released after 180 seconds at 130° C. The following mechanical data are obtained:

| tensile strength | (DIN 53504) | 24 MPa |
|---|---|---|
| elongation at break | (DIN 53504) | 157% |
| tear propagation resistance | (DIN 53515) | 471 N |
| Shore-A-hardness | (DIN 53505) | 96 |
| elasticity | (DIN 53512) | 29 |

EXAMPLE 25

260 g of bis-2,2-(4-cyanatophenyl)-propane are dissolved in 1740 g of a linear polypropylene glycol (OH number 27.5), followed by the addition, at 80° C., of 3 g of dibutyl tin dilaurate. The viscosity rises to from 15,000 to 20,000 cP over a period of 3 hours. 100 parts, by weight, of the thus-modified polyether are mixed with 12.3 parts, by weight, of a trifunctional polypropylene of oxide (starter TMP; OH number 35.4), 20 parts, by weight, of ethylene glycol and 2 parts, by weight, of trimethylol propane. 0.1 part, by weight, of dibutyl tin dilaurate is added to the mixture which, after 10 parts, by weight, of monofluorotrichloromethane have been stirred in, is reacted with 136 parts, by weight, of crude diphenylmethane diisocyanate (approximately 28% NCO).

Following introduction into a mold which had been preheated to 150° C., the mixture of starting materials foams after 20 seconds. The molding obtained, which has a compact outer skin and a cellular core, may be removed after 4 minutes and is hardened by brief heating at 180° C., accompanied by an increase in volume.

What is claimed is:

1. A process for the production of crosslinked plastics based on cyanic acid esters comprising:
   (A) reacting organic polyhydroxyl compounds with polycyanic acid esters at temperatures of from 30° to 150° C. to form partially crosslinked organic solvent-soluble prepolymers, and
   (B) hardening said prepolymer by heating it to from 100° to 350° C.

2. The process of claim 1, wherein said cyanic acid ester is of the general formula:

Ar(OCN)

wherein

Ar represents an aromatic radical or an aromatic radical interrupted by one or more bridge members, and n is a number of from 2 to 5.

3. The process of claim 2, wherein said cyanic acid ester is of the general formula

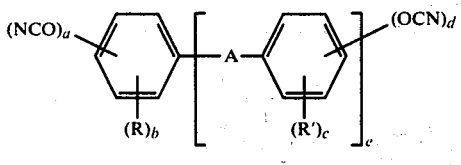

wherein
each R: may be the same or different, and represents (i) hydrogen, (ii) halogen, (iii) straight or branched $C_1$-$C_9$ alkyl, (iv) phenyl, (v) two adjacent radicals R on the same nucleus may together form a carbocyclic 5- or 6-membered ring, (vi) two adjacent radicals R may, together with a hetero atom (O, S, N), form a 5- or 6-membered hetero-cyclic ring, (vii) alkoxy radicals having from 1 to 4 carbon atoms, or (viii) alkoxy carbonyl radicals having from 1 to 4 carbon atoms in the alkyl group;

R': has the same meaning as R or represents the group:

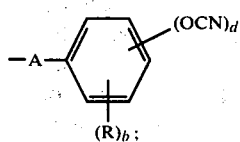

A: represents (i) a direct bond, (ii) a $C_1$-$C_9$ alkylene group optionally substituted by $C_1$-$C_4$ alkyl or phenyl, (iii) a cycloaliphatic or aromatic 5- or 6-membered ring optionally interrupted by oxygen, (iv) oxygen, (v) a sulphonyl group (—$SO_2$—), (vi) a carbonyl dioxide group

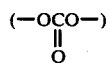

or (vii) a carbonyl group and
a: represents a number of from 1 to 5 when $e \geq 1$, and a number of from 2 to 5 when $e = 0$;
b: represents $5-a$ when $e \geq 1$ and $6-(a+d)$ when $e=0$;
c: represents $5-d$;
d: represents a number of from 0 to 5 and
e: represents 0, 1, 2 or 3
with the proviso that the sum of a and d is always a number from 2 to 5.

4. The process of claim 3, wherein
R: represents hydrogen, fluorine, chlorine or bromine, $C_1$-$C_4$ alkyl, methoxy, ethoxy, methoxy carbonyl, ethoxy carbonyl or butoxy carbonyl;
A: represents a direct bond, oxygen, a sulphonyl group, a carbonyl group, a carbonyl dioxide group, a methylene group, ethylene group, 2,2-propylene group;

or a cyclohexylene radical;
a: represents 1 when $e \geq 1$, and 2 when $e=0$;
b: represents the number 1 or 2;
c: represents the number 1 or 2;
d: represents the number 0 or 1;
e: represents the number 0, 1, 2 or 3, or the proviso that $a+d=2$.

5. The process of claim 1, wherein said polyhydroxyl compound is selected from the group consisting of polyesters, polyethers and polyurethanes having 2 or 3 hydroxyl groups and molecular weights of from 500 to 10,000.

6. The process of claim 1, wherein step (A) is conducted for 0.5 to 5 hours and step (B) is conducted for 2 to 10 hours.

7. The process of claim 6, wherein step (A) is conducted for 1.5 to 3 hours at a temperature of from 50° to 150° C. and step (B) is conducted for 4 to 7 hours at a temperature of from 120° to 250° C.

8. The process of claim 1, wherein said polyhydroxyl compounds are polyethers containing at least 2 hydroxyl groups having a molecular weight of from 500 to 10,000 and wherein catalysts may optionally be present in the reaction.

9. A process for the production of crosslinked plastics based on cyanic acid esters comprising:
(A) reacting organic polyhydroxyl compounds with polycyanic acid esters at temperatures of from 30° to 150° C. to form partially crosslinked, organic solvent-soluble prepolymers, and
(B) reacting it with an organic polyisocyanate.

10. The process of claim 9, wherein said hardening step (B) comprises reacting said prepolymer with an organic polyisocyanate and isocyanate reactive organic compounds.

11. Soluble prepolymers which are stable in storage at room temperature and which contain hydroxyl groups, triazine rings, iminocarboxylic acid ester groups, and optionally free cyanate groups obtained by reacting organic polyhydroxyl compounds with polycyanic acid esters at temperatures of from 30° to 150° C. to form partially crosslinked, organic solvent-soluble prepolymers.

12. The prepolymer of claim 11, containing from 0.5 to 3 triazine rings per molecule.

13. In a process for the production of crosslinked polyurethane plastic by reacting a reaction mixture comprising:
(A) relatively high molecular weight compounds containing isocyanate-reactive hydrogen atoms and
(B) organic polyisocyanates, the improvement wherein said component (A) containing soluble prepolymers which are stable in storage at room temperature and which contain hydroxyl groups, triazine rings, iminocarboxylic acid ester groups, and optionally free cyanate groups obtained by reacting organic polyhydroxyl compounds with polycyanic acid esters at temperatures of from 30° to 150° C. to form partially crosslinked, organic solvent-soluble prepolymers.

14. The process of claim 13, wherein said reaction mixture also contains chain extender and/or catalysts and/or blowing agents.

15. A process for the production of crosslinked plastics based on cyanic acid esters comprising:
(A) reacting polypropylene glycol with bis-2,2-(4-cyanatophenyl)-propane at temperatures of from 30° to 150° C. to form a partially crosslinked, organic solvent-soluble prepolymer, and (B) hardening said prepolymer by heating it to from 100° to 350° C.

16. A process for the production of crosslinked plastics based on cyanic acid esters comprising:
(A) reacting organic polyhydroxyl compounds with or polyfunctional cyanic acid esters at temperatures of from 30° to 150° C. to form a partially crosslinked, organic solvent-soluble prepolymer, and
(B) hardening said prepolymer (i) by heating it to from 100° to 350° C., and (ii) by reacting it with polyisocyanates.

17. The process of claim 16, wherein said step (B) (ii), further comprises reacting said prepolymer with compounds containing isocyanate-reactive groups.

* * * * *